(No Model.) 2 Sheets—Sheet 1.
C. L. DUNHAM.
PIPE WRENCH.
No. 404,781. Patented June 4, 1889.
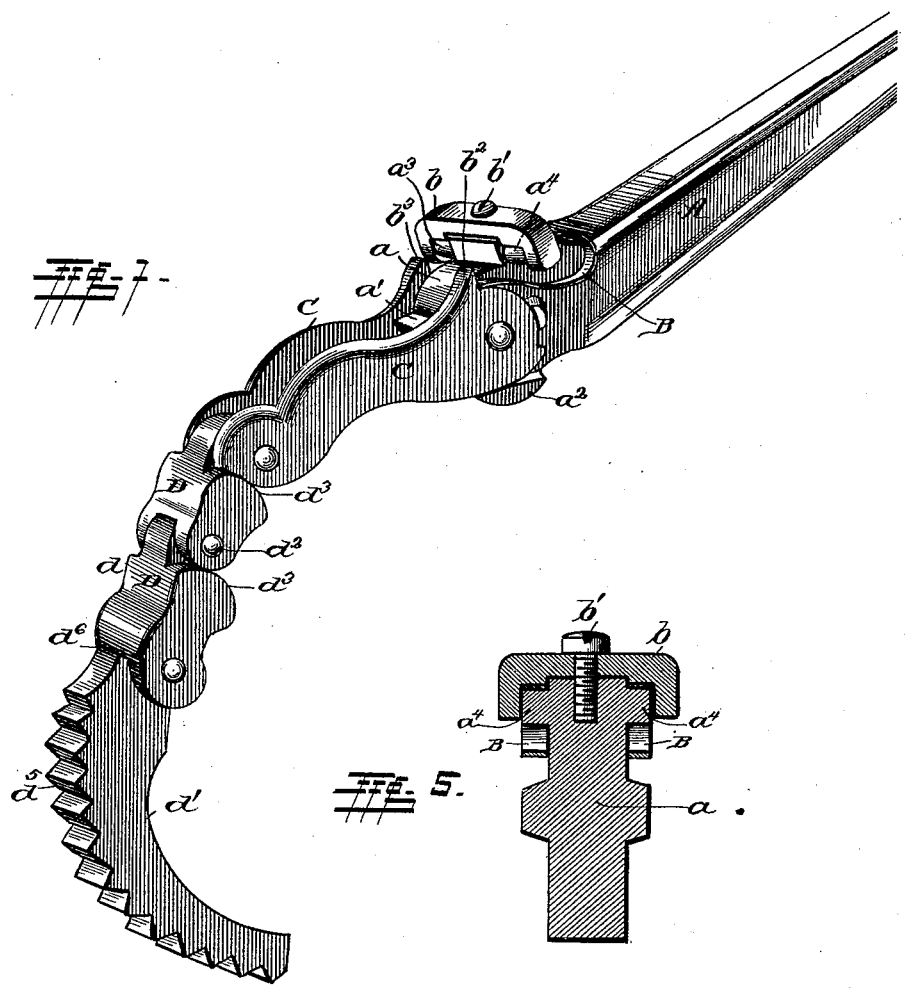
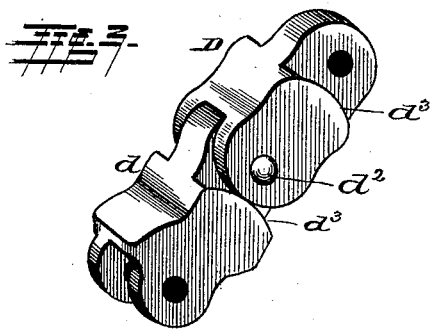
WITNESSES
Edwin L. Yewell,
Jos. A. Ryan.
INVENTOR
Charles L. Dunham,
by J. R. Littell,
Attorney (No Model.) 2 Sheets—Sheet 2.
C. L. DUNHAM.
PIPE WRENCH.
No. 404,781. Patented June 4, 1889.
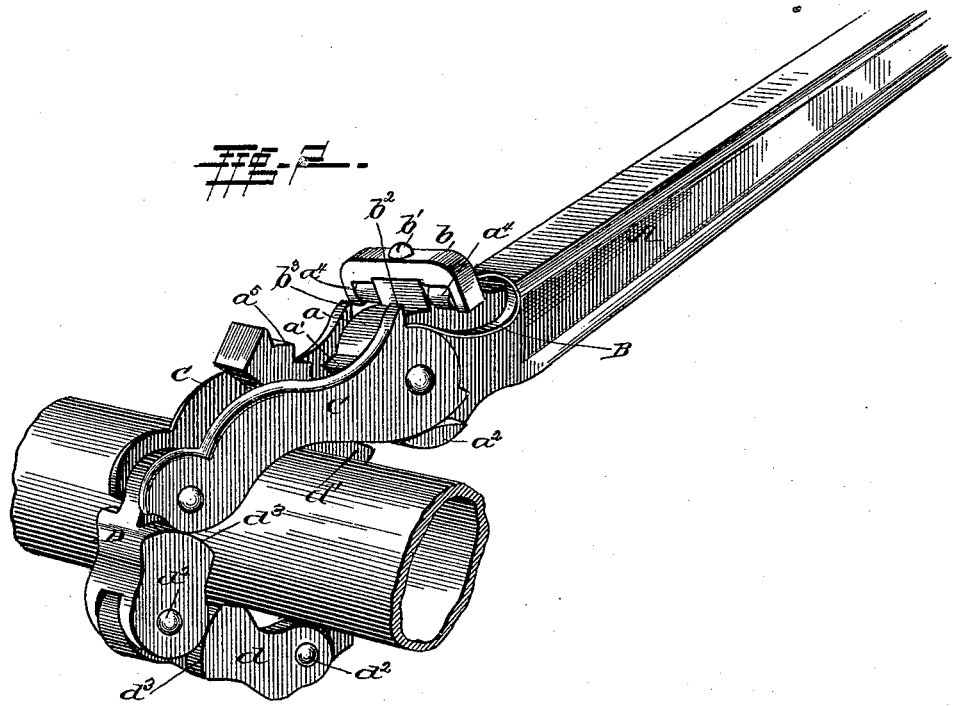
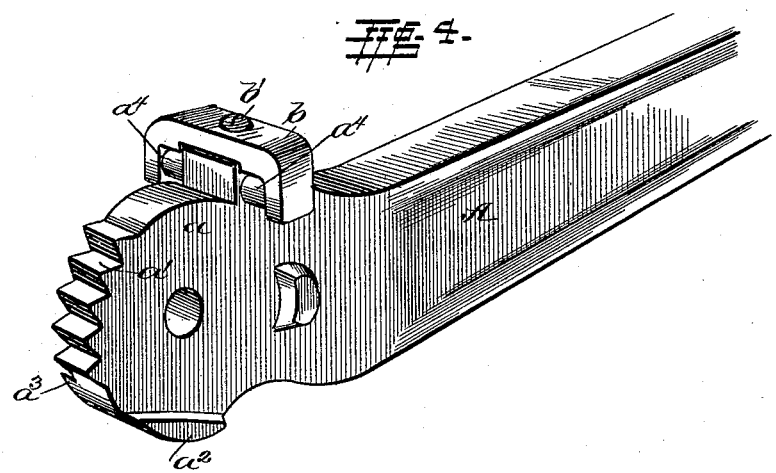
WITNESSES
Edwin L. Yewell.
Jos. A. Ryan.
INVENTOR
Charles L. Dunham,
by J. R. Littell,
Attorney

UNITED STATES PATENT OFFICE.

CHARLES L. DUNHAM, OF UNION CITY, PENNSYLVANIA, ASSIGNOR TO WILLIAM F. RUPP, OF CHICAGO, ILLINOIS.

PIPE-WRENCH.

SPECIFICATION forming part of Letters Patent No. 404,781, dated June 4, 1889.

Application filed January 12, 1888. Serial No. 260,563. (No model.)

*To all whom it may concern:*

Be it known that I, CHARLES L. DUNHAM, a citizen of the United States of America, residing at Union City, in the county of Erie and State of Pennsylvania, have invented certain new and useful Improvements in Pipe-Wrenches, of which the following is a specification, reference being had therein to the accompanying drawings.

This invention pertains to certain new and useful improvements in pipe-wrenches, having for its object the provision of a device of this character whereby the grip or bite can be more readily obtained on the pipe or other article, and also render the device applicable to various-sized pipes without the necessity of any previous adjustment of the parts.

In the accompanying drawings, Figure 1 is a view in perspective of my invention. Fig. 2 is a similar view showing the same as applied in use. Fig. 3 is a detail perspective view of two of the connecting links or sections. Fig. 4 is a view of the operating-handle detached, and Fig. 5 is a sectional view taken through the concentric end thereof.

Corresponding parts in the several figures are denoted by the same letters of reference.

Referring to the drawings, A indicates the operating-handle, provided at its normally lower concentric end $a$ with a segmental rack or teeth $a'$, and at the rear and bottom portions of this concentric end are formed ears or lugs $a^2 a^3$, the inner and upper surfaces of which are preferably flat, as shown.

B B are two springs, rigidly secured each at one end upon the upper surfaces of ears or lugs $a^4$ of a projection of the handle A by means of the approximately inverted-U-shaped plate $b$, the downwardly-projecting ears or lugs of which fit against the ends of the ears or lugs $a^4$, said plate being rigidly held in position by means of a central screw $b'$ passed therethrough, as shown.

C C are two similarly-constructed arms or links pivotally connected at their inner ends to the concentric end of the handle A by means of an ordinary pintle, said arms having rounded ends and ears or lugs $b^2 b^3$. Against these rounded portions of the arms or links C bear the springs B, the ends of said springs bearing against the ears or lugs $b^2$.

The movement of these arms is guided and limited by the ears or lugs $a^3 a^4$ of the handle A.

Between the outer ends of these arms C is connected one end of a link or section D, to which is connected a second link or section $d$, and to the outer end of this latter link or section is connected the inner end of a curved section or pivoted arm $d'$, the connection between these arms and links or sections being effected by stop-joints and pintle $d^2$, as shown. Each link or section D $d$ has a tenon and slot at either end, and on its outer sides projections or shoulders $d^3$, against which will bear the outer ends of the adjoining links or sections when the device occupies the position shown in Fig. 1.

The link or pivoted arm $d'$ is also provided on its outer surface with a segmental rack or teeth $d^5$, as shown, and at its under rear end has a shoulder $d^6$, designed to bear against a shoulder of the adjoining end of the link or section $d$, so as to retain the same in the desired position when opened, as in Fig. 1.

The office of the springs B B is to exert a pressure on the arms C C, so as to hold the same in the desired direction—*i. e.*, with the lower outer ends extending inward—so that after the links or sections and arms are placed around the pipe to be operated upon in such manner as to cause the arm $d'$ to extend between arm C and engage with the concentric rack of the handle A said springs will bear tightly against the rounded portions of said arms C.

In practice the arms and links are passed around or in under the pipe to be operated upon, and the toothed joint or pivoted arm $d'$ is caused to project between the arms C C and its rack or teeth to engage the rack or teeth of the concentric end of the handle A, whereby by pressing on the handle A said link or arm $d'$ and the links or sections will be drawn tightly around the pipe and tightened to the desired extent by means of said rack bars or teeth.

From what has been said of my invention the operation and advantages thereof will be readily apparent to those skilled in the art to which it appertains.

I claim as my invention—

1. The combination, with the handle, of two corresponding arms pivoted one at each side thereof and provided with lugs and curved springs having their free ends engaging said lugs, substantially as set forth.

2. The combination, with the handle, of two corresponding arms pivoted one at each side thereof and provided with lugs, lugs upon said handle, curved springs disposed one at each side the handle and engaging the lugs on the arms, said springs being secured between the lugs on the handle, a plate secured to the latter, an arm provided with teeth, and links connecting the same with the spring-actuated arms, substantially as set forth.

In testimony whereof I affix my signature in presence of two witnesses.

CHARLES L. DUNHAM.

Witnesses:
  M. W. SHREVE,
  E. N. FOSTER.